CYCLOALIPHATIC SULFIDES CONTAINING EPOXIDE GROUPS

Hanswilli von Brachel, Offenbach am Main, and Karl Hintermeier, Frankfurt am Main, Fechenheim, Germany, assignors to Cassella Farbwerke Mainkur Aktiengesellschaft, Frankfurt am Main, Fechenheim, Germany
No Drawing. Filed Nov. 21, 1967, Ser. No. 684,618
Claims priority, application Germany, Nov. 26, 1966,
C 40,814
Int. Cl. C07d 1/18
U.S. Cl. 260—348 R      2 Claims

ABSTRACT OF THE DISCLOSURE

Cycloaliphatic sulfides containing epoxide groups, lower alkyl homologues thereof and a process for their production useful as intermediates and stabilizers.

---

The present invention relates to cycloaliphatic sulfides containing epoxide groups, their lower alkyl homologues and a process for the production thereof.

The epoxide group containing sulfides according to the invention have the formula:

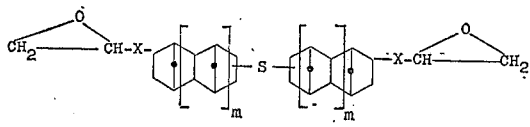

wherein $m$ is the integer 0, 1 or 2, X stands for a direct bond or a methylene, ethylene, —CO—O—$C_xH_{2x}$—, —$C_xH_{2x}$—O—CO— or —$CH_2$—O—$CH_2$— bridge, wherein $x$ is the integer 0, 1 or 2 and each of the bicycloheptane rings may contain up to two lower alkyl groups having 1 to 6 carbon atoms, preferably methyl groups.

The cycloaliphatic sulfides containing epoxide groups and their lower alkyl homologues are obtained by reacting hydrogen sulfide with bicycloheptenes of the formula:

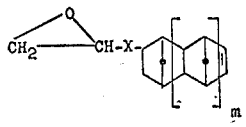

wherein $m$ and X have the meaning given above, or with the lower alkyl homologues thereof, at elevated temperatures and in the presence of free radical catalysts.

Suitable free radical catalysts are, among others, peroxides, such as dibenzoyl peroxide and di-tertiary butyl peroxide and chiefly aliphatic azo compounds decomposing with the generation of nitrogen, such as azoisobutyronitrile, azoisobutyramide and azoisobutyrate. The catalysts are preferably employed in amounts of 0.1 to 5% by weight, referred to the weight of the bicycloheptene. In some cases it is unnecessary to add a catalyst since the bicycloheptenes containing epoxide groups employed as starting materials, contain traces of peroxide which sometimes is sufficient to initiate the reaction.

Whereas the reaction temperatures may be widely varied, it is particularly advantageous to conduct the reaction at temperatures between 30 and 150° C.

The process of the present invention may be conducted with or without inert organic solvents. Appropriate solvents are, for instance, toluene or xylene. If liquid or low-melting bicycloheptenes are used as starting materials, it is easily possible to avoid addition of the solvents.

Surprisingly, the reaction according to the present invention runs smoothly and gives quantitative yields so that, in general, the reaction products are obtained practically free from by-products and unreacted starting material. This smooth course of reaction is to be considered surprising since it was unforeseeable that, under the chosen reaction conditions, the epoxide groups are not attacked by the hydrogen sulfide, or that the mercaptans which possibly have been formed as intermediates, do not react with the epoxide groups still present.

The bicycloheptenes used as starting materials for the process of the present invention may be obtained by methods known per se, for example, according to the teachings of the U.S. Pat. 2,882,279, by diene synthesis from 1 to 3 moles cyclopentadiene or an alkyl homologue thereof, such as 1-, 2- or 3-methyl cyclopentadiene, or from a corresponding ethyl, isopropyl or butyl cyclopentadiene, with 1 mol of an olefine being substituted as desired and containing a terminal epoxide group, such as butadiene monoxide, isoprene monoxide, hexadiene(1,4) or (1,5) monoxide, allyl glycidyl ether, glycidyl esters of the acrylic and methacrylic acid or the like.

The sulfides according to the present invention are valuable intermediates in the manufacture of plastics. They also can be employed together with diamines and polyamines as well as with di- and polycarboxylic acids or their anhydrides, polphenols, polyols or polyisocyanates for the preparation of cast resins, adhesives, fillers, lacquers and varnishes. The compounds of the present invention may also advantageously be employed as stabilizers for halo-containing polymers, such as polyvinyl chloride, polyvinylidene chloride and chlorinated rubber.

The following examples are illustrative of the present invention but by no means limit the scope thereof. The temperatures given are all in degrees centigrade.

EXAMPLE 1

37 g. hydrogen sulfide are passed at 80–85°, in the course of 2 to 3 hours, into a mixture consisting of 272 g. (2 moles) 6-epoxyethyl-bicyclo[2,2,1]-heptene-(2) and 2 g. azoisobutyronitrile. While passing through nitrogen, the mixture is heated to 100° within half an hour and subsequently this temperature is maintained in the vacuum for another hour to remove possibly dissolved hydrogen sulfide residues. As a residue there remain 304 to 306 g. (99–100% of the theoretical) of a nearly colorless, viscous oil that represents practically pure bis-(2-epoxyethyl-bicycloheptyl) sulfide, as is verified by analysis.

Calculated for $C_{18}H_{26}O_2S$ (percent): C, 70.7; H, 8.5; O, 10.4. Found (percent): C, 70.3; H, 8.3; O, 10.7. Calculated (percent): S, 10.4; epoxide content, 28.1. Found (percent): S, 10.6; epoxide content, 27.1.

A mixture composed of 300 g. of this hydrogen sulfide adduct, 260 g. phthalic anhydride and 3 g. dimethyl-ethanol amine may be used as casting material that yields when heated to 130–180° a transparent plastic of high strength. Instead of the phthalic anhydride other anhydrides may also be employed, for instance, maleic anhydride, tetrahydrophthalic anhydride, benzene tetracarboxylic acid anhydride and the like.

By mixing the adduct with equivalent quantities of triethylene tetramine, diethylene triamine or ethylene diamine, fillers and adhesives curing at room temperature are obtained. By adding to these mixtures dimeric and trimeric amines deriving from fatty acid amides, particularly elastic fillers are obtained, which cure at a moderately elevated temperature.

EXAMPLE 2

3 g. azoisobutyronitrile are dissolved in 404 g. of the adduct obtained from 2 moles cyclopentadiene and 1 mol butadiene monoxide of the formula

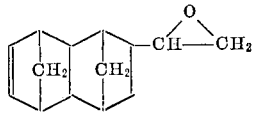

Then, 34 g. hydrogen sulfide are passed at 90°, within one hour, into this solution. To complete the reaction, heating is continued for 2 hours. Then, the solvent is distilled off under reduced pressure and finally the residue is heated to 100°/10 mm. Hg for one hour. 438 g. of a light, high-viscous, nondistillable oil is obtained which, according to the analysis, together with the infrared and the nuclear resonance spectrum, has the formula

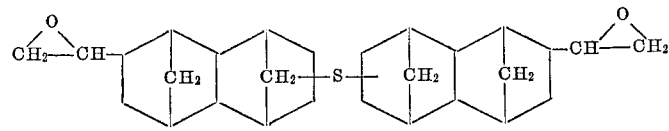

*Analysis.*—Calculated for $C_{28}H_{38}O_2S$ (percent): S, 7.3; epoxide content, 19.6. Found (percent): S, 7.6; epoxide content, 18.2.

A mixture consisting of 436 g. of this adduct put together with 180 g. maleic anhydride, 5 g. triphenyl phosphite and 200 g. fine sea sand can most advantageously be employed as casting material for the preparation of tool handles.

EXAMPLE 3

With vigorous stirring, air is passed at 30° for 3 hours through 360 g. (2 moles) 6-(2,3-epoxidopropoxymethyl)-bicyclo[2,2,1]-heptene-(2) which are then heated to 90°. The air is displaced by pure nitrogen and in the course of 2 to 3 hours 34 g. hydrogen sulfide are introduced with vigorous stirring. To remove possibly unreacted hydrogen sulfide, the mixture is heated under reduced pressure to 100° for one hour, whereby 394 g. of the hydrogen sulfide adduct are obtained. If less hydrogen sulfide should have been absorbed, air and then hydrogen sulfide have to be passed through repeatedly.

The bis-[2-(2,3-epoxidopropoxymethyl) - bicyclo[2,2,1]-heptyl-(5)]sulfide is obtained in the form of a limpid, viscous oil which is slightly discolored towards yellow and is easily miscible with most of the organic solvents.

*Analysis.*—Calculated for $C_{22}H_{34}O_4S$ (percent): C, 67.0; H, 8.6; O, 16.2. Found (percent): C, 67.8; H, 8.6; O, 16.25. Calculated (percent): S, 8.1; epoxide content, 21.8. Found (percent): S, 8.55; epoxide content, 20.3.

The 6 - (2,3 - epoxidopropoxymethyl) - bicyclo[2,2,1]-heptene-(2) used in this reaction and having a boiling point of 132°/19 mm. Hg was obtained with a 74% yield by ten hours heating to 180° of dicyclopentadiene with allyl glycidyl ether.

A mixture composed of 1 mol of the hydrogen sulfide adduct and ⅓ to ½ mol diethylene triamine and 10 to 80% titanium dioxide is a white well curing filler. By adding 1 to 4% of the adduct to an unstabilized polyvinyl chloride the resistance to heat of the polymer is improved.

EXAMPLE 4

416 g. (2 moles) 6-methyl-bicyclo[2,2,1]-heptene-(2)-6-carboxylic acid glycidyl ester and 2 g. azoisobutyronitrile are heated to 80–85°. With stirring, 34 g. hydrogen sulfide are passed into this mixture. Then pure nitrogen is blown through at 100° for half an hour in order to remove the residues of dissolved hydrogen sulfide.

Yield: 445–450 g. (theoretical=450 g.) of a light, very viscous oil that represents practically pure bis[2-methyl-bicyclo[2,2,1]-heptyl - 5 - (6) - carboxylic acid glycidyl ester] sulfide as is verified by the analysis and the infrared spectrum.

*Analysis.*—Calculated for $C_{24}H_{34}O_6S$ (percent): C, 64.0; H, 7.6; O, 21.3. Found (percent): C, 64.6; H, 7.5; O, 20.4. Calculated (percent): S, 7.13; epoxide content, 19.1. Found (percent): S, 7.5; epoxide content, 17.8.

The starting material 6-methyl-bicyclo[2,2,1]-heptene-(2)-6-carboxylic acid glycidyl ester was obtained with a good yield by several hours heating in the autoclave to 150 to 180° of dicyclopentadiene with excess methacrylic acid glycidyl ester together with 1% 3,3′,3′,3′-tetracyclohexyl-4,4′-dihydroxy-diphenyl methane as stabilizer. Isolation was effected by fractional distillation whereby the reaction product has a boiling point of 90–91°/0.05 mm. Hg.

Using, according to the prescription of paragraph 1 of the present example instead of 416 g. 6-methyl-bicyclo[2,2,1]-heptene-(2)-6-carboxylic acid glycidyl ester, 548 g. of the adduct of 2 moles dicyclopentadiene to 1 mol methacrylic acid glycidyl ester, the add being a colorless oil having a boiling point of 135°/0.1 mm. Hg of the formula

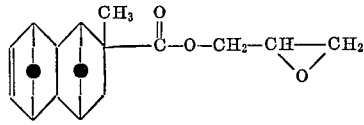

a sulfide is obtained in the form of a slightly yellow, high-viscous oil which, when cooled down, solidifies to a brittle glass being pulverizable.

*Analysis.*—Calculated for $C_{34}H_{46}O_6S$ (percent): S, 5.5; epoxide content, 14.8. Found (percent): S, 5.6; epoxide content, 13.1.

In addition to the above-described starting materials, the following bicycloheptenes can be employed in the process according to the invention as illustrated in the above examples:

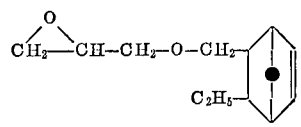

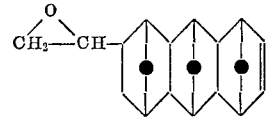

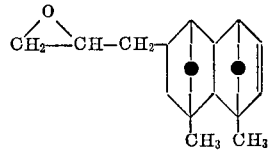

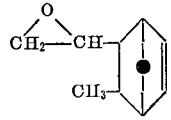

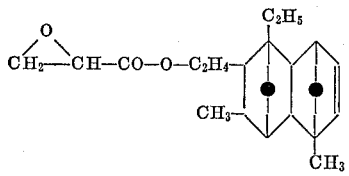
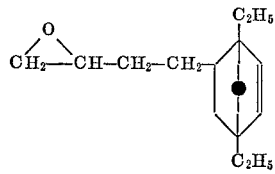
We claim:
1. The cycloaliphatic sulfide of the formula
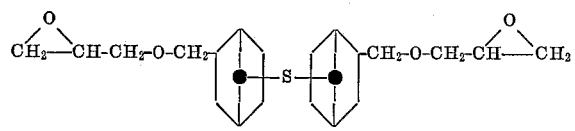
2. The cycloaliphatic sulfide of the formula
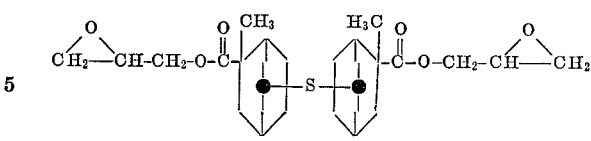
References Cited
UNITED STATES PATENTS
| | | | |
|---|---|---|---|
| 3,459,775 | 8/1969 | Rick et al. | 260—348 |
| 2,882,279 | 4/1959 | Luvisi et al. | 260—348 |
| 3,277,036 | 10/1966 | Whitworth et al. | 260—348 X |
| 3,404,102 | 10/1968 | Starcher et al. | 260—2 |
| 3,187,018 | 6/1965 | Tinsley et al. | 260—348 |
OTHER REFERENCES
Reid, E. Emmet, Organic Chemistry of Bivalent Sulfur, vol. II (1960), pp. 35–6.
NORMA S. MILESTONE, Primary Examiner
U.S. Cl. X.R.
260—348 A, 79.7, 45.8 A